(12) United States Patent
Ho et al.

(10) Patent No.: US 6,742,796 B2
(45) Date of Patent: Jun. 1, 2004

(54) BICYCLE FRAME ASSEMBLY

(75) Inventors: Ivy Ho, Taichung Hsien (TW); Tod Wood, Taichung Hsien (TW)

(73) Assignee: D'Hoch Corporation, Taichung Hsien (TW)

( * ) Notice: Subject to any disclaimer, the term of this patent is extended or adjusted under 35 U.S.C. 154(b) by 0 days.

(21) Appl. No.: 10/178,464

(22) Filed: Jun. 25, 2002

(65) Prior Publication Data
US 2003/0234510 A1 Dec. 25, 2003

(51) Int. Cl.[7] ............................................... B62K 3/02
(52) U.S. Cl. ................................................ 280/281.1
(58) Field of Search ............................ 280/281.1, 287, 280/278

(56) References Cited

U.S. PATENT DOCUMENTS

| | | | | |
|---|---|---|---|---|
| 3,966,230 A | * | 6/1976 | Nicol | 280/281 R |
| 4,145,068 A | * | 3/1979 | Toyomasu et al. | 280/281 R |
| 4,479,662 A | * | 10/1984 | Defour et al. | 20/281 R |
| 4,583,755 A | * | 4/1986 | Diekman et al. | 280/281 R |
| 4,900,049 A | * | 2/1990 | Tseng | 280/281.1 |
| 5,129,666 A | * | 7/1992 | Lai | 280/281.1 |
| 5,609,454 A | * | 3/1997 | Lee | 411/384 |
| 5,842,711 A | * | 12/1998 | Legerot | 280/281.1 |
| 5,937,496 A | * | 8/1999 | Benoit et al. | 29/419.2 |

* cited by examiner

Primary Examiner—Lesley D. Morris
Assistant Examiner—Tony Winner
(74) Attorney, Agent, or Firm—Rosenberg, Klein & Lee

(57) ABSTRACT

A bicycle frame includes a connection part securely mounted to the top of the seat tube and two branches extend from the connection part so as to respectively connected to the top tube and the seat stay by adhesive respectively. A bottom bracket is connected to a bottom of the seat tube and has the other two branches so as to be respectively adhered to the down tube and the chain stay. A head tube is connected to the conjunction of the top tube and the down tube, and a hook plate is connected to the conjunction of the seat stay and the chain stay. The respective axes of the connection part, the seat tube and the head tube are parallel with each other.

2 Claims, 7 Drawing Sheets

BICYCLE FRAME ASSEMBLY

FIELD OF THE INVENTION

The present invention relates to a bicycle frame which includes a three connection parts for respectively connecting respective parts of the frame so that the assembling of the bicycle frame can be made in a short period of time.

BACKGROUND OF THE INVENTION

A conventional bicycle frame 80 is shown in FIG. 7 and generally includes a seat tube 83 with a top tube 81 and a seat stay 84 connected at a higher position of the seat tube 83. A bottom bracket 87 is connected to a lower position of the seat tube 83 and a down tube 82 and a chain stay 85 are connected to the bottom bracket 87. A head tube 86 is connected to the two respective ends of the top tube 81 and the down tube 82. A hook plate is connected to two respective ends of the seat stay 84 and the chain stay 85. It Is to be noted that all the parts mentioned above are connected with each other by welding so as to form a solid frame. Nevertheless, the welding quality is a main concern for a solid frame and the welding processes take a lot of time and involve manual errors. Besides, the size of the bicycle frame cannot be easily changed before welding.

The present invention intends to provide a bicycle frame wherein the top tube, down tube, seat stay and the chain stay are easily adhered with connection parts on the seat tube so that the whole assembly becomes easy and efficient.

SUMMARY OF THE INVENTION

In accordance with one aspect of the present invention, there is a bicycle frame which comprises a seat tube with a connection part connected to a top thereof and a bottom bracket connected to a bottom. The connection part has a first passage for being securely mounted to the seat tube, and a first branch and a second branch which are respectively connected to the top tube and the seat stay.

The bottom bracket has a third branch and a second branch which are respectively connected to the down tube and the chain stay. A head tube is connected to two respective second ends of the top tube and the down tube. A hook plate is connected two respective second ends of the seat stay and the chain stay. The connection part is connected to the seat tube by adhesive.

The primary object of the present invention is to provide a bicycle frame that is easily to be assembled and the size of the frame can be easily changed before assembling.

The present invention will become more obvious from the following description when taken in connection with the accompanying drawings which show, for purposes of illustration only, a preferred embodiment in accordance with the present invention.

DETAILED DESCRIPTION OF THE PREFERRED EMBODIMENT

Figure 1:
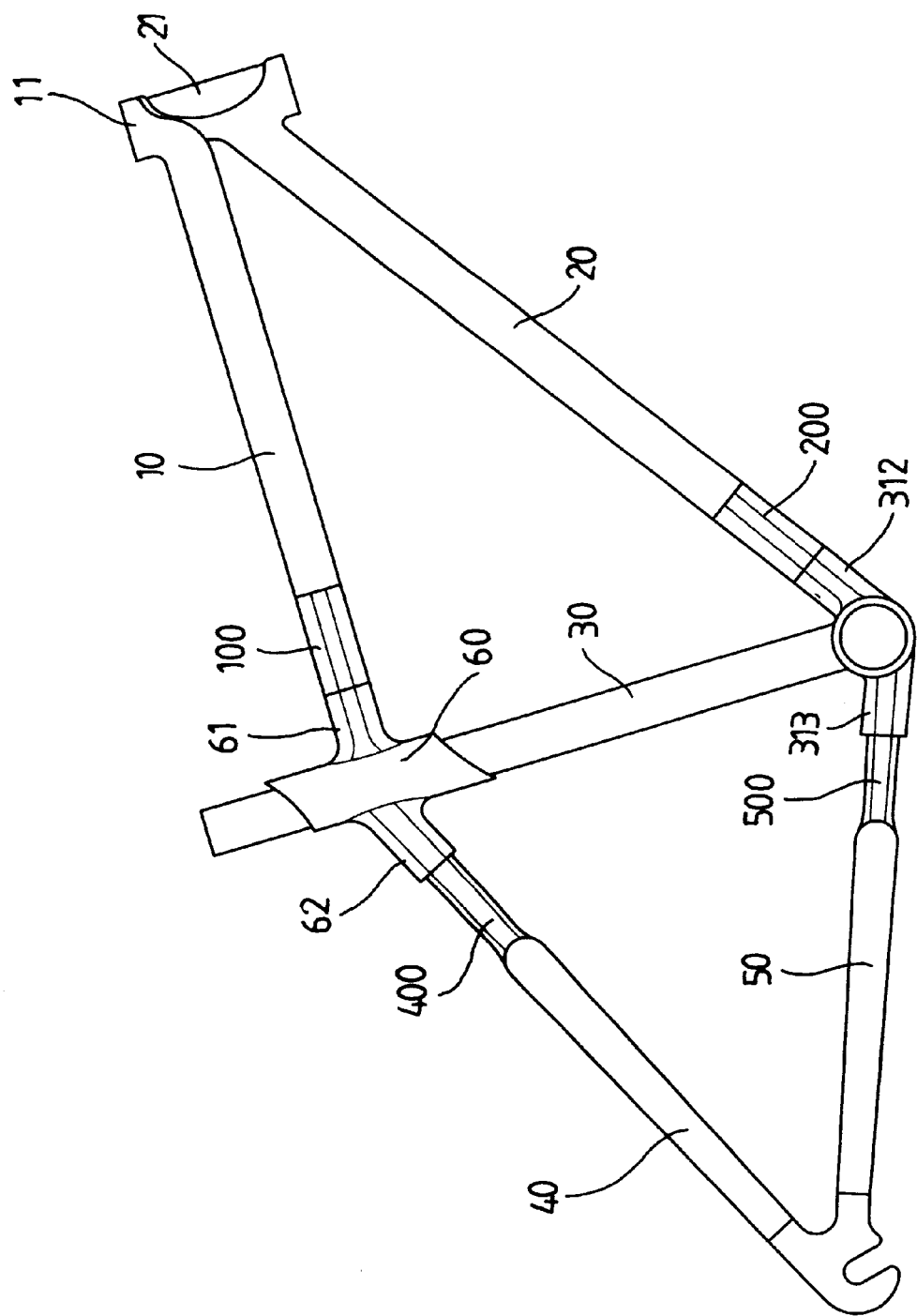
FIG. 1 shows the bicycle frame of the present invention.
Figure 2:
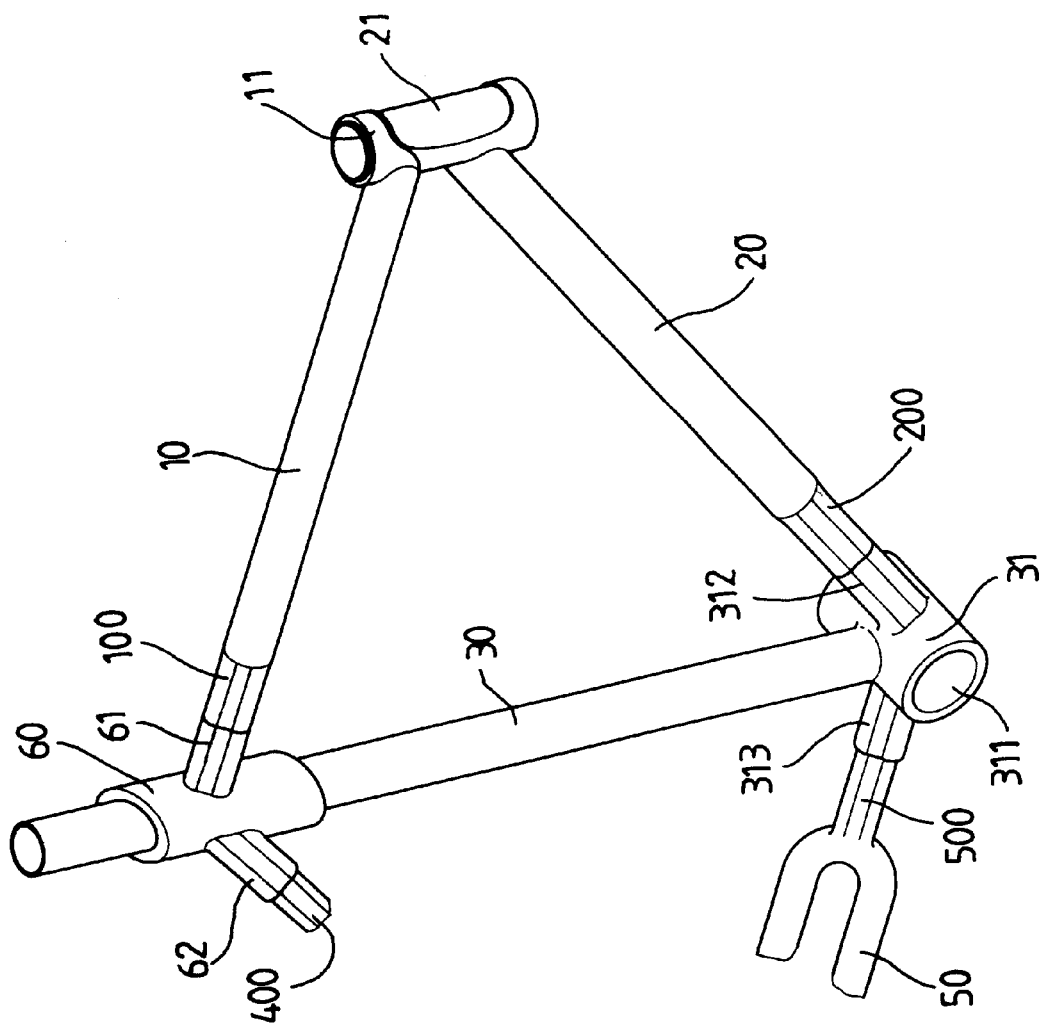
FIG. 2 shows the connection of the connection part and the seat tube, and the connection of the bottom bracket and the seat tube.
Figure 3:
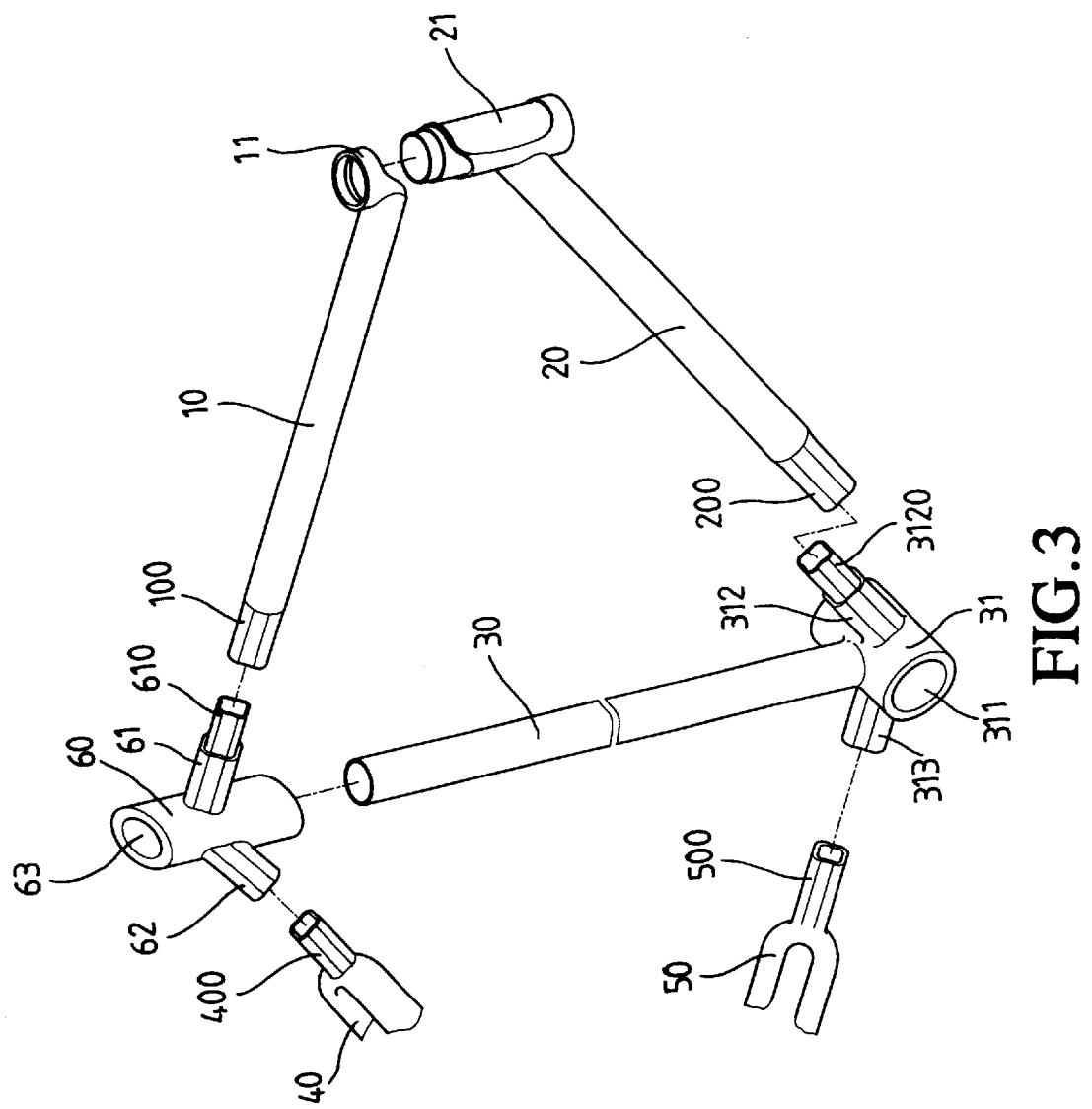
FIG. 3 is an exploded view to show the bicycle frame of the present invention.
Figure 4:
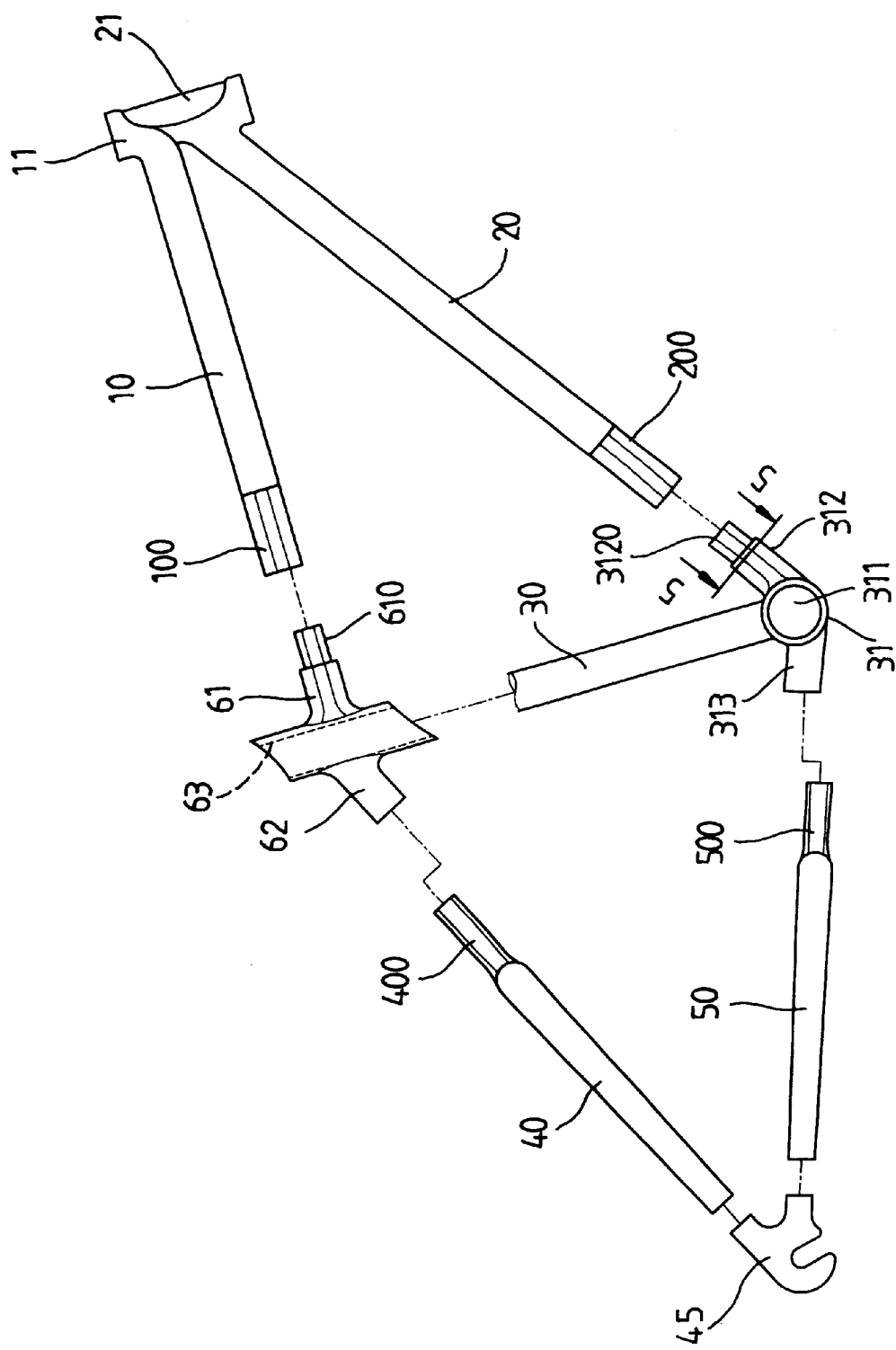
FIG. 4 is another exploded view to show the bicycle frame of the present invention.

Referring to FIGS. 1 to 5, the bicycle frame of the present invention comprises a seat tube 30 and a connection part 60 is mounted to the first end of the seat tube 30. The connection part 60 has a first passage 63 through which the top of the seat tube 30 extends and is secured by adhesive, and a first branch 61 and a second branch 62 respectively extend from the connection part 60. A connection tube 610 extends from the first branch 61 and has a polygonal outer periphery.

A top tube 10 has a first end 100 which has a polygonal outer periphery so as to be securely mounted to the connection tube 610 and secured by adhesive. A collar 11 is connected to the second end of the top tube 10.

Figure 5:
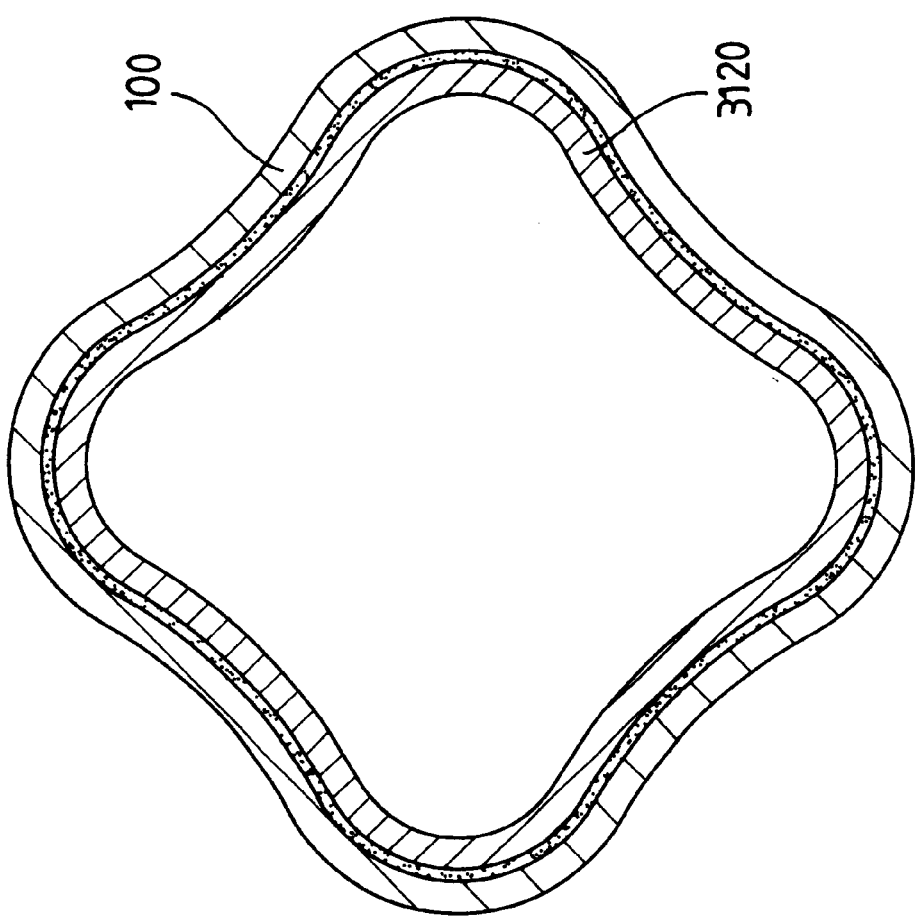
FIG. 5 is a cross sectional view to show the connection tube of the connection part and the top tube of the bicycle frame of the present invention.

A bottom bracket 31 is connected to a second end of the seat tube 30 and includes a passage 311 for installing the crank (not shown). A third branch 312 and a fourth branch 313 extend from the bottom bracket 31. A connection tube 3120 extends from the third branch 312 and has a polygonal outer periphery. As shown in FIG. 5, the polygonal outer periphery may take the form of an undulating rectangular cross-sectional contour. Additionally, the first, second and fourth branches may similarly have an undulating rectangular cross-sectional contour, as shown in FIG. 5.

A down tube 20 has a first end 200 which has a polygonal outer periphery which is securely mounted to the connection tube 3120 by adhesive. A head tube 21 is connected to the second end of the down tube 20 and the collar 11 is securely mounted to the head tube 21.

A seat stay 40 has a first end 400 which is a polygonal tube and is securely inserted to the second branch 62 on the connection part 60 by adhesive. A chain stay 50 has a first end 500 which is a polygonal tube which is securely inserted to the fourth branch 313 on the bottom bracket 31.

A hook plate 45 is connected two respective second ends of the seat stay 40 and the chain stay 50 so as to be connected to the shaft of rear wheel hub (not shown).

The respective axes of the connection part 60, the seat tube 30, and the head tube 21 are parallel with each other so that when assembling the bicycle frame, a lot of assembling time is saved. This allows the connection part 60, the seat tube 30, and the head tube 21 to be assembled at one time.

Figure 6:
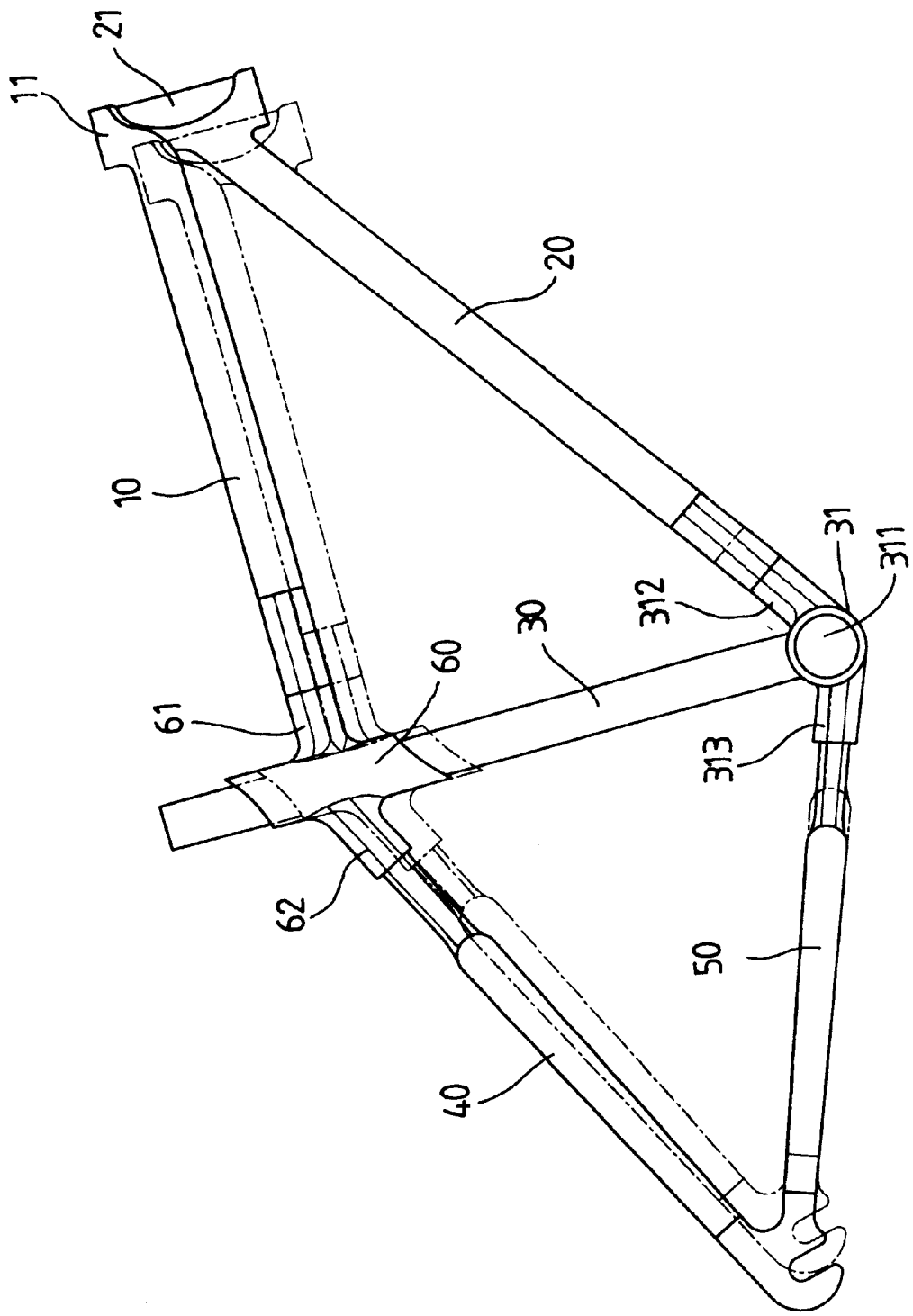
FIG. 6 shows the size of the bicycle frame can be made by cutting the tubes.
Figure 7:
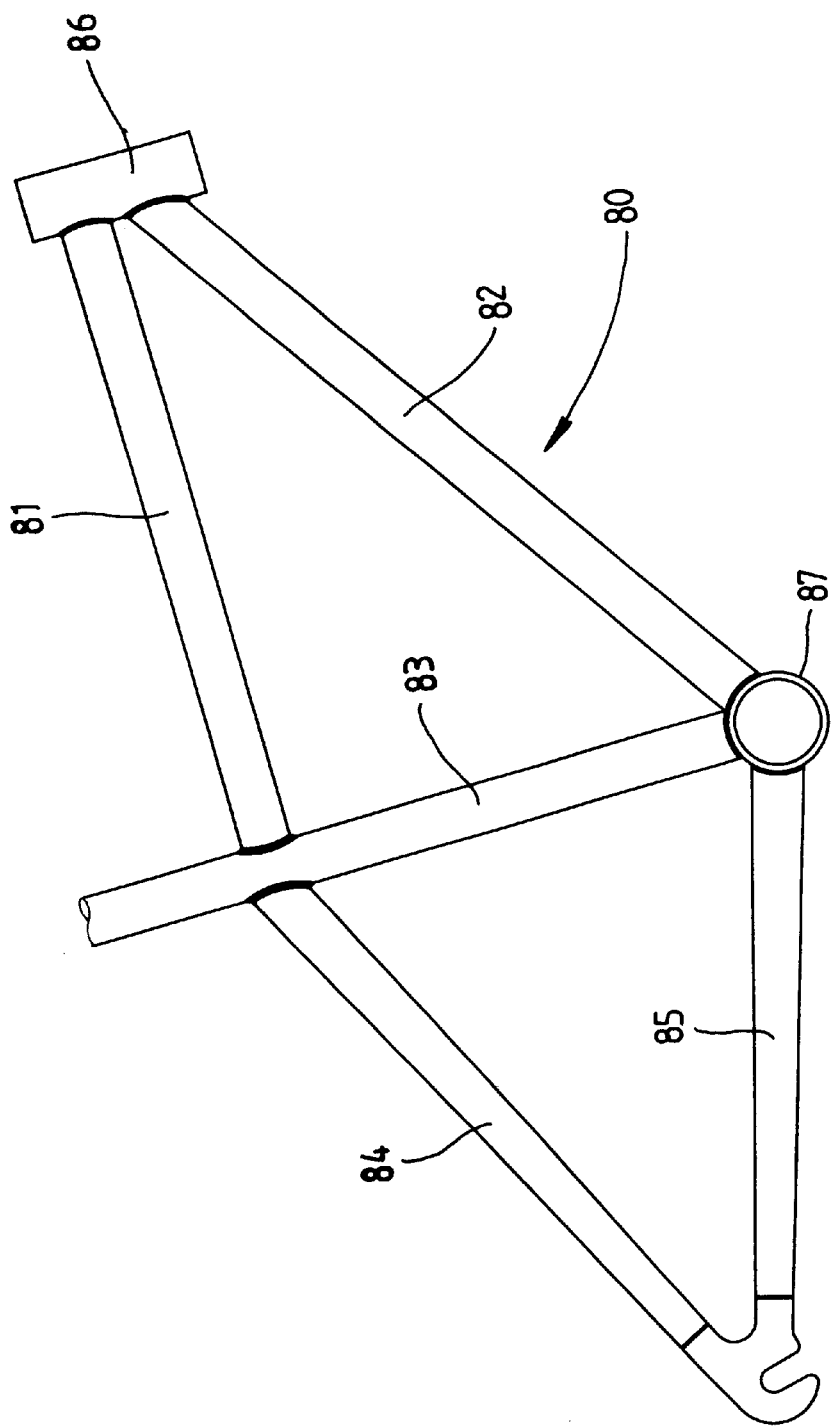
FIG. 7 shows a conventional view bicycle frame.

As shown in FIG. 6, if the bicycle frame is to be made in a small size, simply cut the length of the first end 100, the connection tube 610/3120, the first end 200 of the down tube 20, the first end 400 of the seat chain 40, or the first end 500 of the chain stay 50.

While we have shown and described the embodiment in accordance with the present invention, it should be clear to those skilled in the art that further embodiments may be made without departing from the scope of the present invention.

What is claimed is:

1. A bicycle frame comprising:

a seat tube having opposing first and second ends;

a connection part having a first passage extending axially therethrough, the connection part having a first branch extending from one side thereof and a second branch extending from an opposing side of the connection part, the first end of the seat tube extending through the first passage and being secured thereto;

a first connection tube having a first portion joined to the first branch and a second portion extending therefrom;

a top tube having a first end and an opposing second end, the first end of the top tube being securely connected to the second portion of the first connection tube to abut the first branch;

a bottom bracket connected to the second end of the seat tube, the bottom bracket having a third branch extending from one side thereof and a fourth branch extending from an opposing side of the bottom bracket;

a second connection tube having a first portion joined to the third branch and a second portion extending therefrom;

a down tube having a first end and an opposing second end, the first end of the down tube being securely and connected to the second portion of the second connection tube to abut the third branch; a head tube respectively connected to the second ends of the top tube and the down tube;

a seat stay having a first end and an opposing second end, the first end of the seat stay being connected to the second branch of the connection part;

a chain stay having a first end and an opposing second end, the first end of the chain stay being connected to the fourth branch of the bottom bracket, and a hook plate respectively connected to the second ends of the seat stay and the chain stay.

2. The frame as claimed in claim 1, wherein each of the first branch, the second branch, the third branch, the fourth branch, the first connection tube, the second connection tube, and the first ends of each of the top tube, the down tube, the seat stay, and the chain stay has an undulating rectangular cross-sectional contour.

\* \* \* \* \*